United States Patent
Carter et al.

(10) Patent No.: US 8,958,312 B2
(45) Date of Patent: Feb. 17, 2015

(54) METHOD AND SYSTEM FOR PERFORMING SIP LOOPBACK IN COMMUNICATION DEVICES

(75) Inventors: Wade Carter, Snellville, GA (US); David Glandon, Travelers Rest, SC (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1271 days.

(21) Appl. No.: 12/248,865

(22) Filed: Oct. 9, 2008

(65) Prior Publication Data

US 2009/0129557 A1  May 21, 2009

Related U.S. Application Data

(60) Provisional application No. 60/978,600, filed on Oct. 9, 2007.

(51) Int. Cl.
*H04J 3/14* (2006.01)
*H04M 3/22* (2006.01)
*H04L 29/06* (2006.01)

(52) U.S. Cl.
CPC ......... *H04M 3/2209* (2013.01); *H04L 65/1069* (2013.01); *H04M 2203/055* (2013.01); *H04L 65/1006* (2013.01)
USPC ...................................... 370/249; 379/22.01

(58) Field of Classification Search
None
See application file for complete search history.

(56) References Cited

U.S. PATENT DOCUMENTS

| | | | | |
|---|---|---|---|---|
| 5,872,770 A * | 2/1999 | Park et al. | ................. | 370/241.1 |
| 7,433,941 B1 * | 10/2008 | Lavian et al. | ................. | 709/223 |
| 2006/0154665 A1 * | 7/2006 | Svensson et al. | ............. | 455/436 |
| 2006/0159116 A1 * | 7/2006 | Gerszberg et al. | ............ | 370/431 |
| 2006/0245368 A1 * | 11/2006 | Ladden et al. | ................ | 370/248 |

* cited by examiner

*Primary Examiner* — Andrew Lai
*Assistant Examiner* — Leon Andrews
(74) *Attorney, Agent, or Firm* — Troy A. Van Aacken

(57) ABSTRACT

A system operator provisions, or loads, a user's communication device, such as a cable modem, with multiple sets of loopback mode parameters that each facilitate a loopback test, and associates each set with multiple loopback numbers, or variable values. The loopback variables may be MIBs assigned to the device's manufacturer for use in initiating a loopback test of a user device. An operator may initiate a loopback test from a central computer device located remotely from the user device. The initiating device may be coupled to an operator's private IP network, or to a network coupled to the user device. The initiating device sends one of the loopback values in a SIP Invite message to the user device, without the use of SIP extensions, in a call. The user device recognizes the loopback value, auto-answers the call, and performs actions according to the provisioned parameters corresponding to the loopback value.

8 Claims, 4 Drawing Sheets

METHOD AND SYSTEM FOR PERFORMING SIP LOOPBACK IN COMMUNICATION DEVICES

CROSS REFERENCE TO RELATED APPLICATION

This application claims priority under 35 U.S.C. 119(e) to U.S. provisional patent application No. 60/978,600 entitled "SIP Loopback," which was filed Oct. 9, 2007, and is incorporated herein by reference in its entirety

TECHNICAL FIELD

The claimed subject matter relates to communications networks and devices, and more particularly, to provisioning communication devices using loopback sessions.

BACKGROUND

Loopback testing is performed by voice over internet protocol ("VoIP") service providers, which are often cable television network operators (sometimes referred to as multiple services operators ("MSO")) to test the connectivity and quality of connection from a network test point and their subscribers' network interface units ("NIU"). 'Connectivity' refers to the ability to establish a voice call with a telephony subscriber and 'quality of connection' refers to levels of jitter, latency, and packet loss for packets, and voice path transmission characteristics such as idle channel noise. MSOs typically use two different types of loopback: real time protocol ("RTP") packet loopback and pulse code modulation ("PCM") loopback. MSOs use RTP loopback to measure the quality of connection at the packet level and PCM loopback to measure quality of connection at the PCM level of a voice call.

Loopback allows MSOs to determine call quality based on returning media to the originator of a call. Typically, MSOs implement loopback based on an extension to the Session Description Protocol for Media Loopback (draft-ietf-mmusic-media-loopback-05). MSOs typically support two types of loopback: media loopback and packet loopback. As with NETWTEST according to the PacketCable specification, media loopback passes through the DSP on the mirroring side. On the other hand, packet loopback re-encapsulates RTP data in IP, UDP, and RTP headers. This is analogous to NETWLOOP under PacketCable specification.

When a communication device, such as an IP telephone, or other communication device that carries VoIP calls, receives a loopback call, the receiving device does not ring, but a media terminal in the device typically 'answers' the call and processes the loopback operations. The OPTIONS method may be used to query the MTA to determine if a connection is available for loopback. In addition, the OPTIONS method may define a services delivery platform along with the codecs the platform supports, thus allowing an MSO to determine if a queried MTA supports loopback.

SUMMARY

A simple loopback feature uses provisioned phone numbers to begin loopback processing. Different numbers are provisioned for each different loopback type. When the MTA receives a call from a provisioned number, the call is answered automatically with the provisioned loopback type, or mode.

Two new management information base variables, ("MIB") allow MSOs to provision numbers for loopback. Incoming calls from a number, or value, to a user device, such as, for example, a media terminal adaptor ("MTA"), or an embedded media terminal adaptor ("EMTA"), where the number, or value, matches one of the provisioned numbers will cause the user device to enter the corresponding loopback mode. The phone (facilitated by the MTA, or EMTA) will not ring and will auto-answer the call. For example, if the number, or value, in the incoming call matches sipCfgMediaLoopbackNumber, the user device will enter media loopback mode, which is analogous to NETWTEST. If the number, or value, in an incoming call matches sipcfgPacketLoopbackNumber, the user device will use packet loopback mode, which is analogous to NETWLOOP.

DETAILED DESCRIPTION

As a preliminary matter, it will be readily understood by those persons skilled in the art that the present invention is susceptible of broad utility and application. Many methods, embodiments and adaptations of the present invention other than those herein described, as well as many variations, modifications, and equivalent arrangements, will be apparent from or reasonably suggested by the present invention and the following description thereof, without departing from the substance or scope of the present invention.

Accordingly, while the present invention has been described herein in detail in relation to preferred embodiments, it is to be understood that this disclosure is only illustrative and exemplary of the present invention and is made merely for the purposes of providing a full and enabling disclosure of the invention. The following disclosure is not intended nor is to be construed to limit the present invention or otherwise to exclude any such other embodiments, adaptations, variations, modifications and equivalent arrangements, the present invention being limited only by the claims appended hereto and the equivalents thereof.

Figure 1:
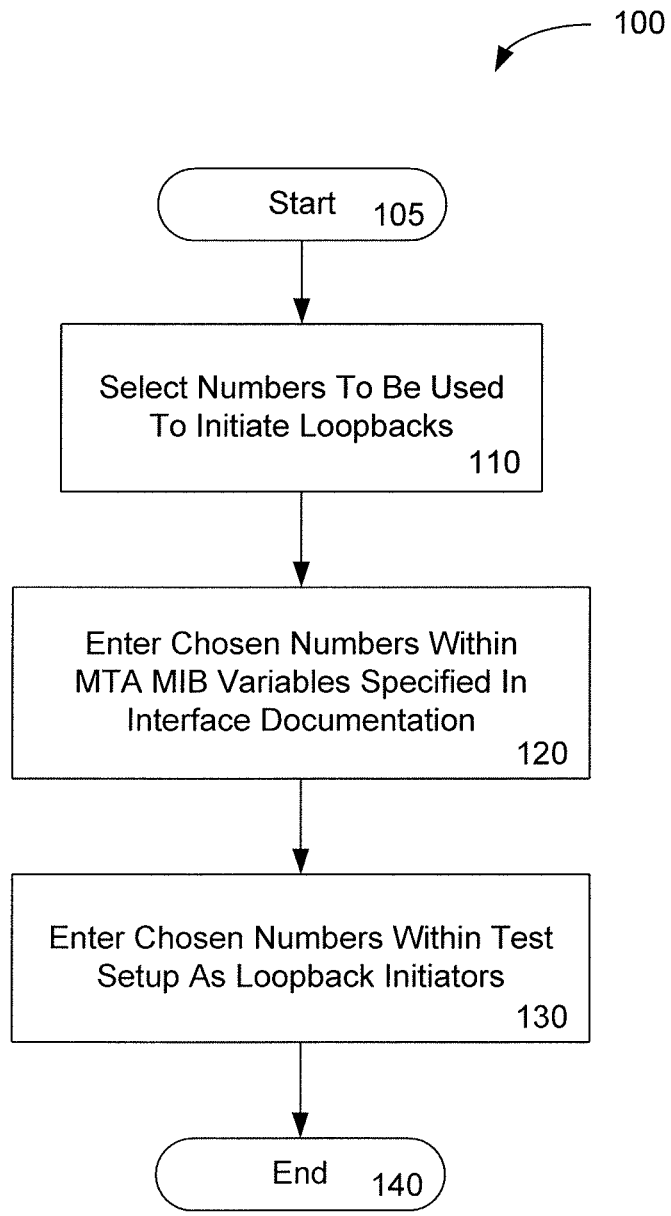
FIG. 1 illustrates flow diagram of a method for provisioning a device for accepting receiving and performing loopback calls.

Turning now to the figures, FIG. 1 illustrates a method 100 for provisioning numbers, or values, as an MIB, to facilitate loopback of a communication device using standard SIP commands and functions without the use of SIP extensions. Method 100 starts at step 105, and at step 110 the method selects numbers, or values, to associate with corresponding loopback modes. For example, as discussed above, an MSO may select values, for example, ten-digit telephone numbers, to associate with MIBS. At step 120, a manufacturer of a user device, such as a cable modem with an MTA, or an EMTA, may associate the numbers selected by the MSO with the corresponding MIB variables in the software code loaded into the device at manufacture. Upgrades and updates to the device's software may also include associations of numbers, either the same as the original number, or new numbers, with the MIBs, or possibly newly available MIBs. As an example, the software may associate a predetermined number, such as a ten-digit telephone number, with the MIB sipCfgMediaLoopbackNumber, and a different ten-digit number with the MIB sipcfgPacketLoopbackNumber. These two just-referenced MIBs may be referred to hereinafter as loopback MIBs, or loopback variables. At step 130, an MSO, or equipment supplier to an MSO, for example, enters the loopback MIBs, or the values associated with them, at a loopback test device, or software instance, at a location that may be physically, as well as logically, remote from the user device to be loopback tested. Method 100 ends at step 140.

Figure 2:
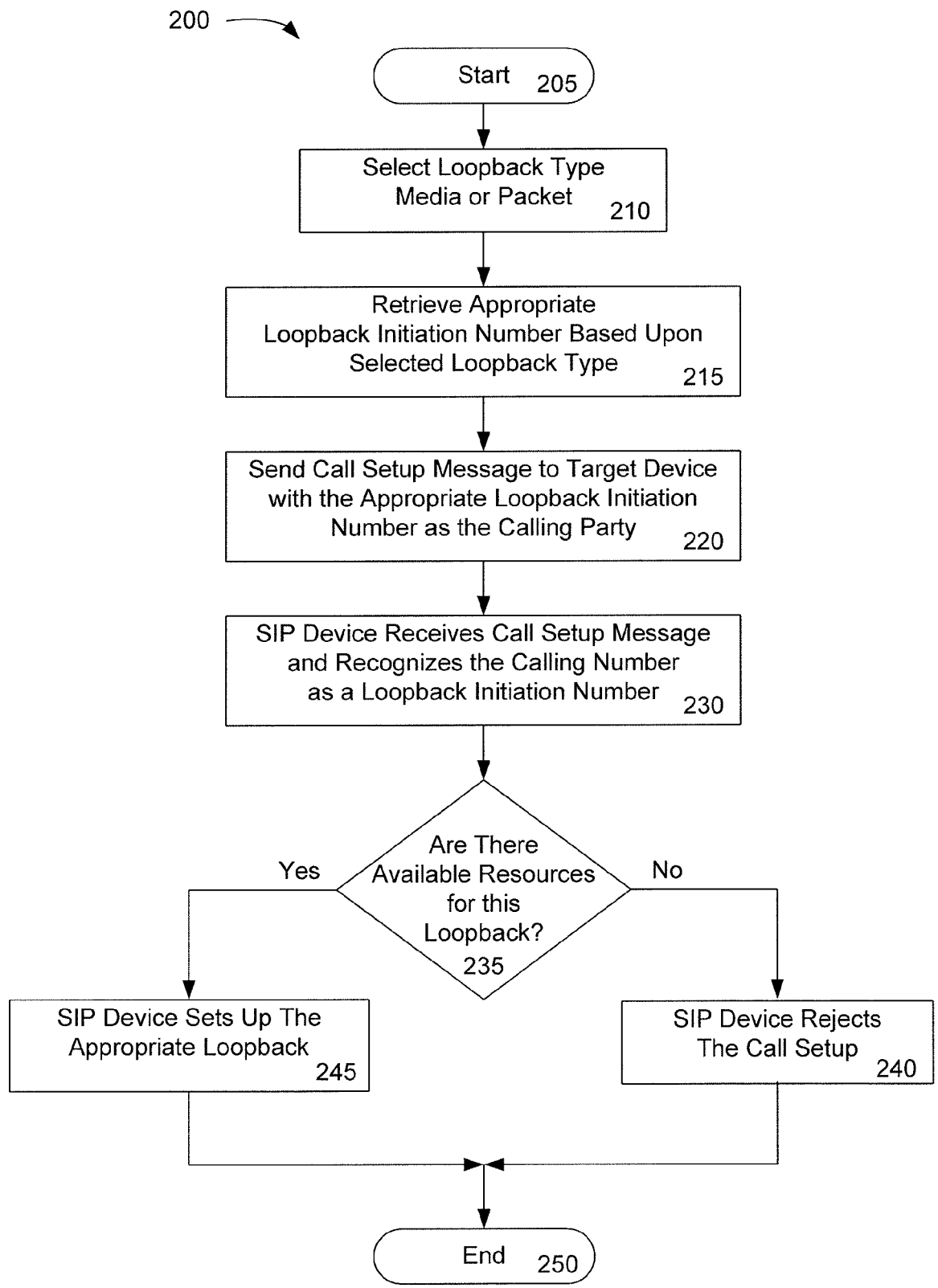
FIG. 2 illustrates a flow diagram for initiating a loopback call.

Turning now to FIG. 2, the figure illustrates a flow chart for a method 200 for initiating a loopback operation. Method 200 starts at step 205 and at step 210, an operator, or an operator's network testing device, determines a type of loopback test to perform for a given subscriber device. MSO personnel may manually determine, and input, a desired loopback type into a user interface, either at the network device that will perform the loopback test, or remotely from another device over a network the testing device and the user interface are coupled to. At step 215, the testing device retrieves from a database a loopback number, or value, that corresponds to the desired loopback mode, or type. The testing device inserts the variable, or value, that corresponds to the desired loopback in a SIP Invite message to be sent to the user device to be tested. At step 220, the testing device sends the message containing the values corresponding to the desired loopback mode to; the device to be tested. Assuming that the device to be tested can recognize and respond to SIP messages, the device to be tested receives the SIP Invite message at step and 230. At step 230, the device recognizes the loopback variable, or value, as corresponding to a loopback mode, and looks in its provisioned information to determine the loopback mode parameters that the value in the loopback variable corresponds to. The provisioned parameter information is the information provisioned into the user device to be tested at step 120 as described in reference to FIG. 1. Continuing with the description of FIG. 2, after the SIP user device to be tested receives the SIP Invite message, it determines whether it can adequately process the loopback test. If the user device to be tested is currently processing another call, the device may not have adequate processing and memory resources to support the loopback mode being requested. If the device to be tested determines at step 235 that it cannot process the loopback, it rejects the invitation to process the loopback call at step 240, and method 200 ends at step 250.

If, however, the user device determines at step 235 that it has adequate resources to process the loopback call requested in the SIP Invite message received at step 230, the user device to be tested sets up the appropriate loopback mode corresponding to the value contained in the loopback variable contained in the SIP Invite message. The user device uses information provisioned into it at step 120 in FIG. 1 to prepare itself for processing a loopback call corresponding to the loopback variable value in the SIP Invite message received at step 230.

Figure 3:
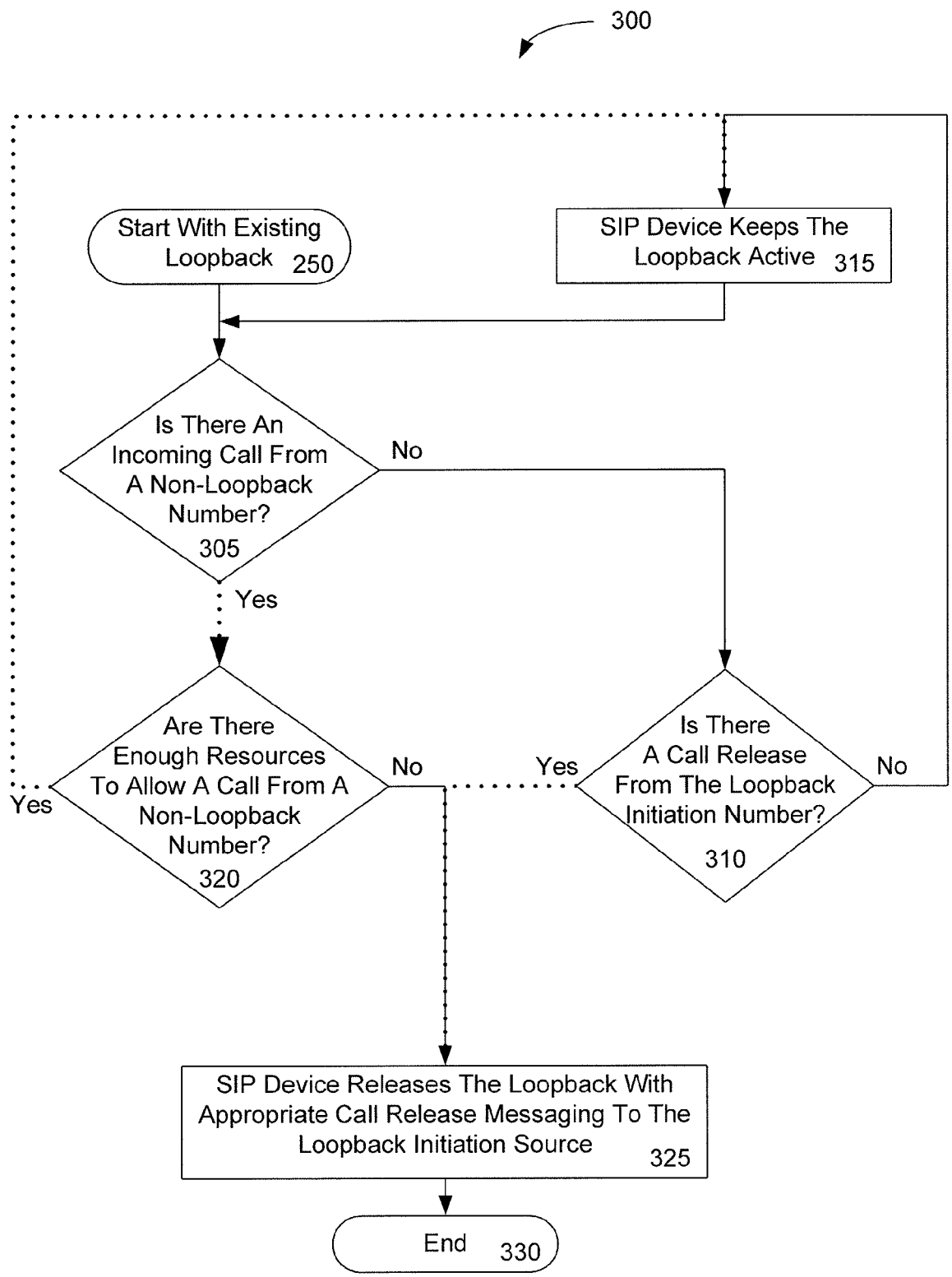
FIG. 3 illustrates a flow diagram for operating a device while also processing a loopback call.

Turning now to FIG. 3, the figure illustrates a flow diagram of a method 300 for operating a user device while it is under loopback testing. Method 300 starts at step 250, the ending step of method 200 illustrated in FIG. 2. As shown in FIG. 3, after the loopback process begins, the user device processor polls its connection at step 305 to the communication network over which the loopback test is progressing, to determine whether it is receiving incoming calls from non-loopback numbers. If the user device determines at step 305 that it is not receiving an incoming request to set up another call from a nonloopback number, method 300 determines at step 310 whether it has received a loopback test release message from the loopback number that initiated the current loopback test. If method 300 does not determine at step 310 that it has received a loopback test release, method 300 continues to step 315 and continues the loopback testing.

Returning to the description of the figure at step 305, if method 300 determines that it is receiving a call from a nonloopback number, the method proceeds to step 320. At step 320, the user device determines whether it has adequate resources to process the incoming nonloopback call while continuing to process the current loopback call. If the user device determines at step 320 that it cannot process the incoming call loopback call as well and the current loopback call, method 300 proceeds to step 325 and releases the loopback testing operation and concurrently sends a call release message to the loopback initiating network device. Thus, if a user device cannot process a loopback test and an incoming nonloopback call simultaneously, the user device gives priority to the nonloopback incoming call and drops the loopback call, which the initiating device can initiate again at another time. Method 300 ends at step 330.

Figure 4:
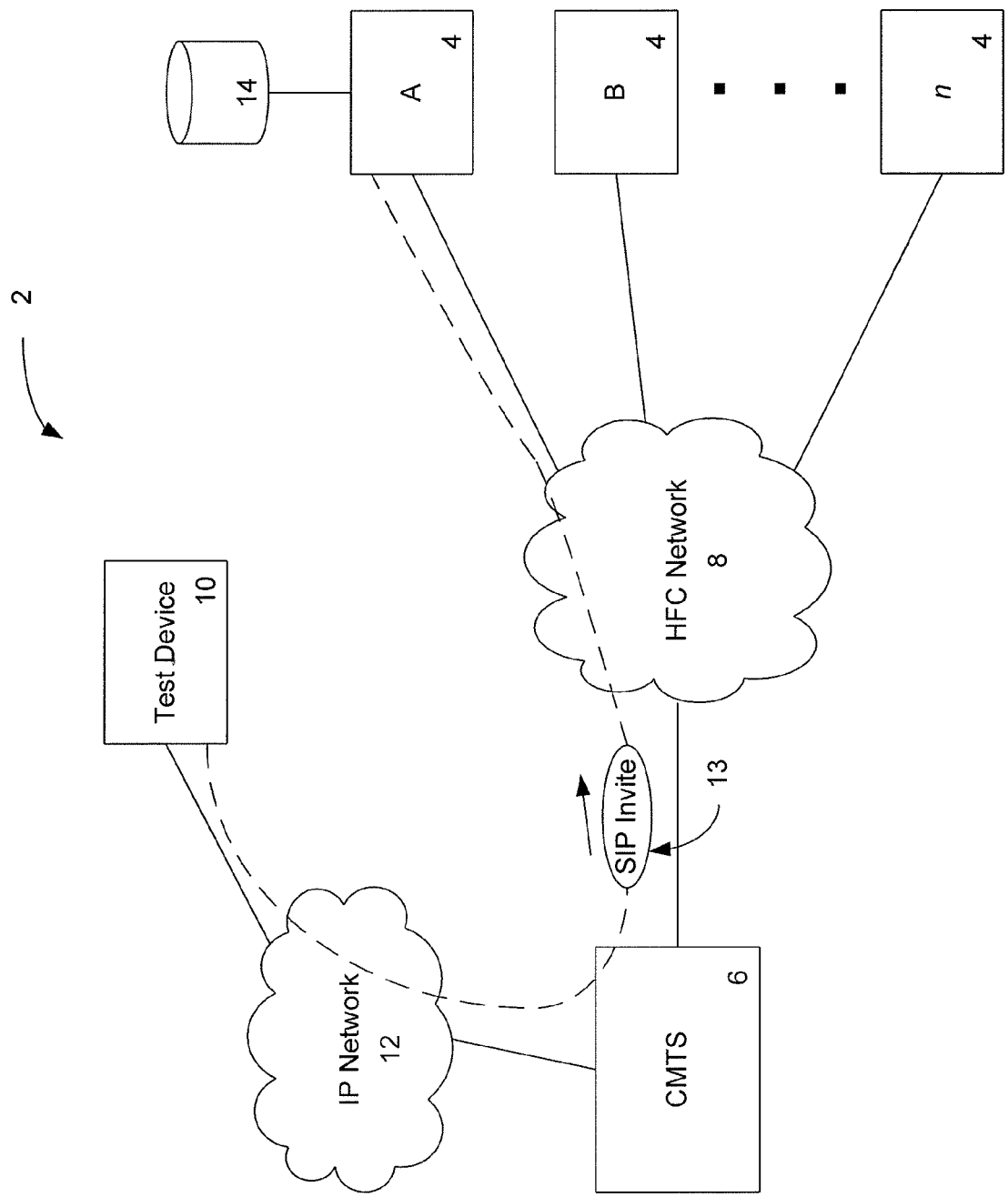
FIG. 4 illustrates a system for performing a loopback test of a user device.

Turning now to FIG. 4, the figure illustrates a system 2 for performing a loopback test of one of a plurality of SIP-enabled user devices 4. For example, a SIP enable device 4 may include a MTA, or EMTA, processor, and may couple to cable modem termination system ("CMTS") 6 via hybrid fiber coaxial network 8. CMTS 6 and a testing device 10, such as a computer, typically couple to an operator's private IP network 12. Computer 10 initiates a SIP loopback Invite message 13 to user device 4A. device 4A looks up a loopback variable value contained in message 10 in a memory 14. Memory 14 may have been provisioned with one, or more, loopback variable values with each associated with a set of parameters and actions, and other information, to facilitate a loopback test. Thus, device 4A is a device under test and computer 10 is a testing device.

These and many other objects and advantages will be readily apparent to one skilled in the art from the foregoing specification when read in conjunction with the appended drawings. It is to be understood that the embodiments herein illustrated are examples only, and that the scope of the invention is to be defined solely by the claims when accorded a full range of equivalents.

What is claimed is:
1. A communication device loopback method, comprising:
provisioning the communication device with one or more loopback values over a voice over internet protocol (VoIP) network assigned using a management information base object stored on the communication device, the communication device operating on a data over cable service interface specification protocol on a hybrid fiber-coax network, whereby the provisioning occurs during initialization with the hybrid fiber-coax network using the management information base object to assign the one or more loopback values to the communication device;
associating each of the one or more loopback values with a loopback mode using standard session initiation protocol commands and without the use of session initiation protocol extensions; and
originating a call to the device on the hybrid fiber-coax network using standard session initiation protocol ("SIP") commands by sending a SIP Invite message over the hybrid fiber-coax network to the communication device, and using one of the loopback values assigned to the device based upon the management information base object in a calling number identifier included in the SIP invite message, wherein the SIP Invite message does not use SIP extensions.

2. The method of claim 1 wherein a media loopback mode is associated with a media loopback value.

3. The method of claim 1 wherein a packet loopback mode is associated with a packet loopback value.

4. A method for performing loopback testing of a communication device that has been provisioned with one or more loopback values before performing of the loopback testing occurs, the provisioning occurring during initialization of the communication device for operation on a hybrid fiber-coax network, wherein each of the loopback values corresponds to a loopback type, comprising
- receiving a SIP Invite message in a call at the communication device over a voice over internet protocol (VoIP) network, wherein the SIP Invite message includes a value in a calling party identification field,
- determining at the communication device that the calling party identification matches a loopback instruction;
- processing the call at the communication device in response to the SIP Invite message according to the loopback instruction contained in the calling party identification field, and
- entering a loopback mode at the communication device corresponding to the loopback type associated with the value contained in a loopback instruction; and
- wherein the SIP Invite message does not include an explicit loopback request apart from the calling party identification.

5. The method of claim 4 wherein the loopback mode is a media loop back when the value in the loopback instruction indicates that the communication device should enter media loopback mode.

6. The method of claim 4 wherein the loopback mode is a packet loop back when the value in the loopback instruction indicates that the communication device should enter packet loopback mode.

7. The method of claim 4 further comprising dropping a loopback testing call if the communication device receives an incoming nonloopback call from a nonloopback number if the user device cannot continue to process the current loopback test and the incoming nonloopback call simultaneously.

8. A system for performing a loopback test of a communication device, comprising:
- a network device coupled to a communication network configured to facilitate voice telephony services according to a voice over internet protocol (VoIP) standard;
- a user device coupled to the communication network configured to provide receive and transmit telephony call messages on the communication network according to the voice over internet protocol standard, and to interface internet protocol messages to, and from, signals usable by a human, and
- wherein the network and user devices are configured to transmit and receive session initiation protocol messages over the communication network, and
- wherein the network device is configured with loopback variable values that correspond to a loopback mode, the loopback variable values used to initiate a loopback test of the user device using a SIP Invite message based upon inclusion of predetermined values in a calling party identification included in the SIP Invite message; and
- wherein the user device is provisioned with the loopback variable values so that when it receives a SIP Invite message in an incoming call with the loopback variable value contained in the SIP Invite message, the user device recognizes the incoming call as a loopback test request and enters a loopback test mode provisioned into the user device that corresponds to the loopback variable value in the incoming SIP Invite message, the provisioning occurring during an initialization process with the network device.

* * * * *